MICKLEY & HARTMAN.
Wagon Brake.
No. 109,832.  Patented Dec. 6, 1870.
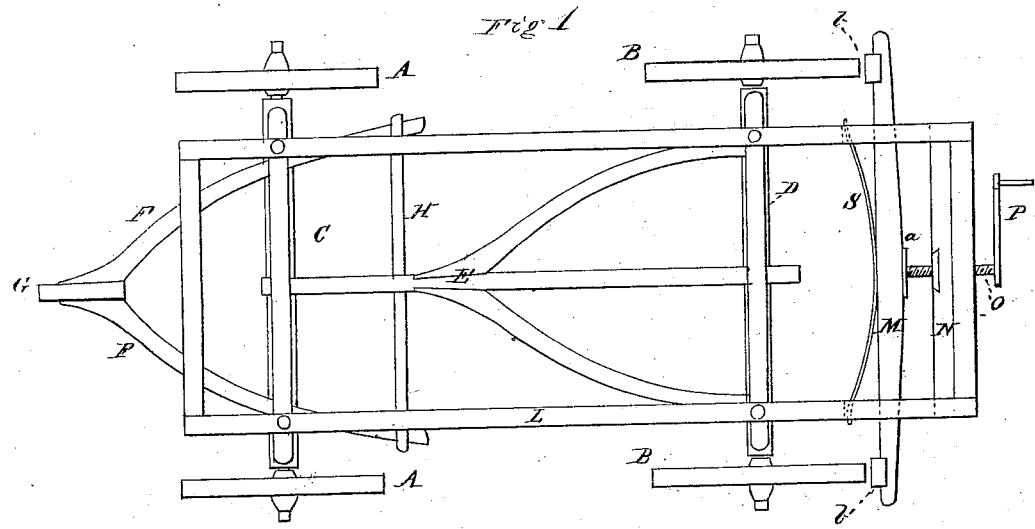
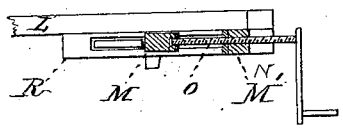

United States Patent Office.

JACOB MICKLEY AND JOHN E. HARTMAN, OF CASHTOWN, PENNSYLVANIA.

Letters Patent No. 109,832, dated December 6, 1870.

IMPROVEMENT IN WAGON-BRAKES.

The Schedule referred to in these Letters Patent and making part of the same.

*To all whom it may concern:*

Be it known that we, JACOB MICKLEY and JOHN E. HARTMAN, both of Cashtown, in the county of Adams and State of Pennsylvania, have invented certain new and useful Improvements in Wagon-Brakes; and we do hereby declare the following to be a clear and exact description thereof, sufficient to enable others skilled in the art to which our invention appertains to fully understand and use the same, reference being had to the accompanying drawing making part of this specification, in which—

Figure 1 is a top or plan view of our improved wagon-brake;

Figure 2 is a section of the mechanism for operating the brake-bar; while

Figure 3 is a cross-sectional view of the brake-bar, showing the endless screw swiveled thereto.

The object of this invention is to lock the rear wheels of a wagon while descending a hill, and, at other times, when desired, without subjecting said wheels and wagon-gearing to the great strain incident to chain and other locking devices; and to this end, Our invention consists in locating and arranging on the rear of the hind wheels of a wagon a brake-bar, which is operated by an endless screw, in such a manner that the brake-shoes or blocks upon each end of the brake-bar are forced against the hind wheels or withdrawn from the same by the turning of the endless screw; also in the combination with a brake-bar of a spring, which, by its tension, will cause the brake-shoes or blocks to strike or come in contact, in unison, with the rear wheels, and, at the same time, will aid in forcing out laterally the brake-bar, carrying the shoes or rubber blocks back out of contact with the wheels when the endless screw is turned in the direction designed to unlock the wagon.

In the drawing—

A A may represent the front wheels, and B B, the rear or hind wheels, mounted upon their respective axles C and D;

E is the perch connecting together the front and rear axles; while

L is a rack-frame or sills of a wagon-body, and

G is the pole secured between the futchells F F.

So far the description of the running-gear is that of the ordinary and usual construction.

Upon the bottom of the rack or sill L of a wagon, we secure in a firm and substantial manner, a cross-bar or beam, N, made of metal or wood, at or about the center of which, if wood be used, is inserted a suitable metallic plate or nut-casting, M', to receive an endless screw, hereinafter to be mentioned. If metal be used, the metal plate is dispensed with, as the female portion of the screw may be cut therein.

M' is a brake-bar made of metal or wood, as desired, adapted to freely slide within suitable slots or guide-plates, rigidly secured to or formed with the rack or sill L in the rear of the hind wheels. This brake-bar M carries upon its outer ends brake-shoes or blocks, made of any desired material, and of a shape best adapted to accomplish the object herein sought.

O is what may be termed an "endless screw," formed or provided with a suitable crank or lever, P, said screw passes through a metallic plate or nut-casting, M', of the cross-bar N, its inner end being swiveled within a plate, a, upon the brake-bar M, in such a manner that as the crank or lever P is turned in one direction, the shoes or blocks of the brake-bar will be forced up against the wheels, and the same locked in a reliable manner, but when turned in the opposite direction the wheels will be released and free to revolve.

A spring, S, extending from side to side of the wagon-bed or sill, is secured to the brake-bar, preferably upon the side facing the front of the wagon, its ends passing through the slots or guide-plates within which the brake-bar moves. This spring is designed to guide and cause both of the brake-shoes or blocks to strike the hind wheels in unison. As the endless screw is turned the brake-bar is moved equally on each end toward the wheels, it also performs another important function, that is to aid in forcing backwardly the said brake-bar, carrying the brake-shoes or blocks when the endless screw is turned and it is desired to unlock the wagon.

Instead of a spring attached at or near the center of the brake-bar, as shown, coiled springs may be located within the slots or guide-plates or attached otherwise at or near each end and produce the same result.

Springs may be secured at or near each end, or at about the center upon the extreme rear part of the body, and connected to the side of the brake-bar facing the rear of the wagon, to such modifications the invention is not limited.

Its operation and special advantages are many.

When it is desired to lock the wagon upon descending a hill, it will be evident that when the crank or other lever turns the endless screw, a greater or lesser amount of friction may be applied to the hind wheels and the brake-bar remains in position, and does not require the attention of the driver or attendant after the endless screw has been operated, and the shoes or blocks of the brake-bar come in contact with the wheels.

Thus it will be seen that we have produced a wagon-brake that after once placed in position by the operator or driver, requires no further attention, except so far as being released when the hill has been descended.

Having thus described our invention,

What we claim as new, and desire to secure by Letters Patent, is—

1. A brake-bar, adapted to slide within slots or guides attached to or formed with a rack or sills of wagons, when said bar is located behind the rear wheels, and operated by an endless screw, substantially as described.

2. A bar, N, secured to a body or running-gear of a wagon, in such a manner as to support an endless screw which operates a brake-bar carrying a spring, located in the rear of the hind wheels, substantially as described, for the purpose set forth.

3. The bar N, provided with a nut-casting, within which works an endless screw, swiveled or otherwise attached to a brake-bar carrying brake-shoes or blocks, and acting in conjunction with a spring in reference to the rear or hind wheels of a wagon, substantially as described, for the purpose set forth.

To the above we have signed our names this 8th day of August, 1870.

JACOB MICKLEY.
JOHN E. HARTMAN.

Witnesses:
A. G. COVER,
ISAAC NEITZ.